Aug. 17, 1965   A. E. KNOTOWICZ   3,201,785
INDICATING DEVICE
Filed Sept. 23, 1963
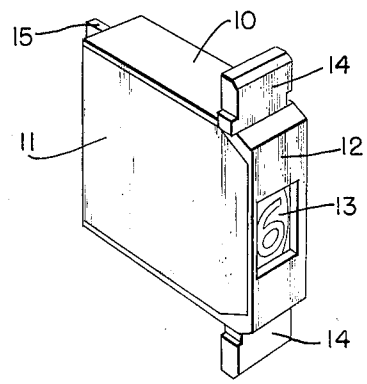
FIG.1
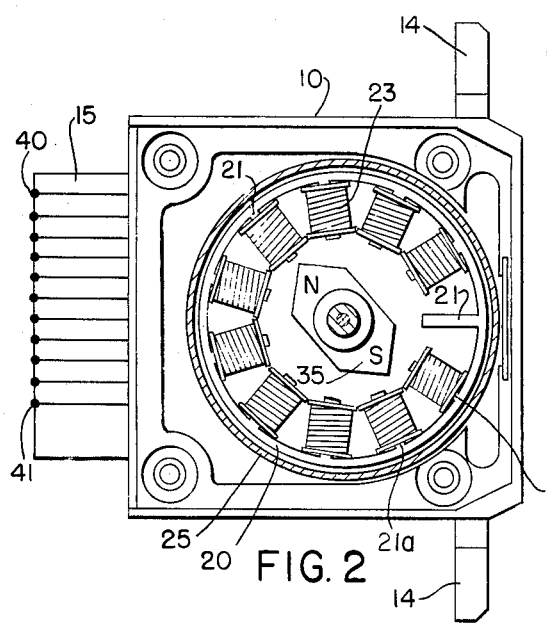
FIG. 2
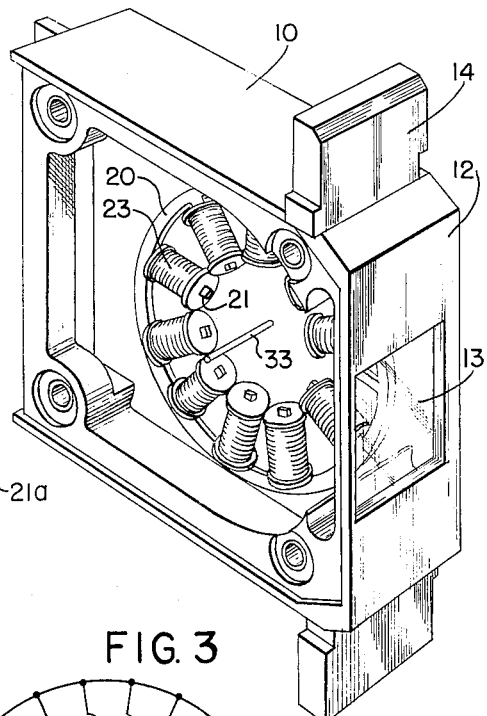
FIG. 3
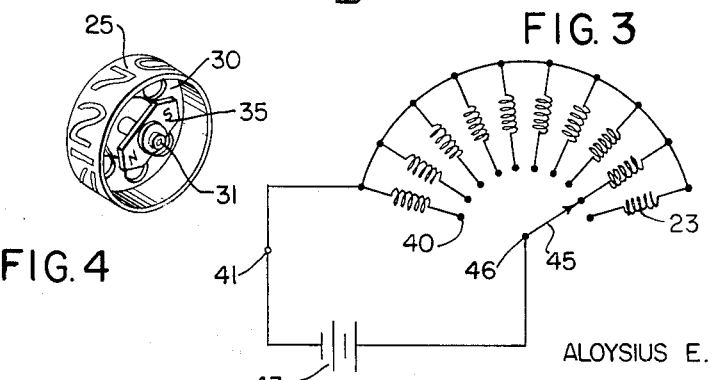
FIG. 4
FIG. 5
INVENTOR.
ALOYSIUS E. KNOTOWICZ
BY
ATTORNEYS

United States Patent Office 3,201,785
Patented Aug. 17, 1965

3,201,785
INDICATING DEVICE
Aloysius E. Knotowicz, Torrington, Conn., assignor to The Patent Button Company, Waterbury, Conn., a corporation of Connecticut
Filed Sept. 23, 1963, Ser. No. 310,805
2 Claims. (Cl. 340—378)

The present invention relates in general to numerical indicating devices and more particularly to an electromagnetic indicator providing rapid response and exact positioning of a preselected character corresponding to an applied electrical signal.

The field of character indicating data display devices is a relatively well developed one and a large variety of devices employing mechanical linkages, electro-mechanical arrangements, or electromagnetic forces have been built. The electromagnetic indicating devices have significant advantages, particularly in the field of airborne instruments where both high speed response and light weight is important. One type of electromagnetic character indicating device known in the prior art employs a cylindrical stator element having disposed around the periphery of its inner surface a number of electromagnets generally arranged so that diametrically opposed pairs are selectively energizable, thus providing a magnetic field oriented along the diameter between the two energized electromagnets. A rotor element is pivotally mounted concentrically with the stator element and has an outer cylindrical surface bearing the characters to be displayed. The rotor element has fixed to it a permanent magnet and the position of the magnet and hence of the rotor within the stator is of course controlled by the disposition of the magnetic field resulting from the energized electromagnets. Thus, the permanent magnet of the rotor aligns itself between the diametrically opposed pairs of energized electromagnets and the cylindrical surface bearing the displayed character is then rotated into different positions as different pairs of electromagnets are energized. Another type of indicator employs one-half the number of electromagnets and reverses the polarity of the energizing voltage to obtain the full number of display positions.

One of the more serious problems arising with the types of electromagnetic indicators described above arises when the indicator is to be rotated through 180°. This is generally accomplished by reversing the polarity of the energization applied to the pair of electromagnets in the first type or a single electromagnet in the other type. In a perfectly aligned device, however, no rotational torque would be applied by reversing the polarity and even in a non-perfectly aligned device the rotational torque applied to the rotor by a reversal of polarity of the same electromagnet is relatively small.

One means for obviating this difficulty is described in U.S. Patent 2,943,313. The device described therein, however, is complex in construction inasmuch as the positioning of the magnetic elements in the stator must be carefully arranged in order to provide sufficient eccentricity and yet retain accurate centering of the characters to be indicated within the display window. Another limitation on such a device, is that the power must be off in order to center the indicated character, and to rotate 180° from that character. Hence, a definite cycle of power on and power off must be established.

It is, therefore, the primary object of the present invention to provide a fast response time, compact electromagnetic character display device.

It is another object of the present invention to provide an electromagnetic character display device in which no magnetic detent elements are required in the stator element and yet which does not have any position in which very low initial rotational torque is developed as contrasted to the other digital positions.

It is still another object of the present invention to provide a character indicating device in which the position of the indicated character remains the same with power on or off and in which the indicator works equally well in response to a duty cycle of power on—power off or in response to a duty cycle in which power is always applied.

Broadly speaking, the present invention employs a cylindrical stator element having a number of electromagnets disposed circumferentially on its inner surface. The number of electromagnets is equal to the number of characters to be displayed, however, the electromagnets are so spaced that no two electromagnets are diametrically opposed. The rotor element for this character indicator again consists of a permanent magnet pivotally mounted at the center of the stator and having a cylindrical portion fixed to it and adapted to rotate with it with the characters to be indicated being inscribed on the outer cylindrical surface of the rotor. The stator and rotor are both enclosed in a housing having a window of sufficient size to display one of the indicating characters at a time. In order then to indicate a particular character, one electromagnet is energized thus causing the permanent magnet of the rotor to align itself with the resulting magnetic field. The characters are arranged on the outer portion of the rotor such that when the permanent magnet is aligned with the magnetic field resulting from the energization of a specific electromagnet, the character corresponding to that electromagnet is centered in the display window. When the energization power is removed from the selected electromagnet the rotor remains in that position since the magnetic field now carries through the permanent magnet and around the cylindrical inner surface of the stator element which is formed in part, of magnetically conducting material. To change the indicated character to another selected indicated character, the energization current is applied to another electromagnet corresponding to the second indicated character. Since none of the electromagnets are diametrically opposed, then under no circumstances is it required for the electromagnet to rotate 180°, or to put it another way, the alignment of the magnetic field is never changed by exactly 180°, and hence when any electromagnet is energized a rotational torque is applied to the rotor element.

Since the stator element contains no permanent magnets, then the positioning of the indicating character does not require any particular sequence of power on and power off. If one electromagnet is energized corresponding, for example, to the numeral "1," and immediately thereafter an electromagnet corresponding to the numeral "3" is energized with the electromagnet corresponding to "1" being de-energized, the indicator will move to display the numeral "3." It is not required that there be any portion of time with power off. On the other hand, if a period of time without any energization applied elapses between the energization of the electromagnet corresponding to the numeral "1" and the energization of the electromagnet corresponding to the numeral "3," the indicator will work equally well.

The invention is more fully described in conjunction with the accompanying drawings in which:

FIG. 1 is an illustration in perspective view of a character indicating device in accordance with the principles of the present invention;

FIG. 2 is a side view of the indicating device of FIG. 1 with the side cover of the housing and the side portion of the rotor removed in order to show the internal construction of the device;

FIG. 3 is a perspective view of the device of FIG. 1 with the side cover and the rotor element removed;

FIG. 4 is an ilustrated perspective view of the rotor element for the device of FIG. 1; and FIG. 5 is an illustration in schematic form of the electrical circuit of the device illustrated in FIG. 1.

With reference now specifically to FIG. 1, the indicating device includes a generally rectangular housing 10 which is enclosed on one side by a cover plate 11. The front face 12 of the housing 10 contains a transparent window 13 through which each individual character being displayed may be seen. A pair of flanges 14 extend upwardly from the top and downwardly from the bottom of the front face 12 and serve, if desired, as a mounting bracket for the unit. The device shown in FIG. 1 displays one of the selected group of characters at a time. For example, the device may be arranged to display any one of the numerals 0 through 9, with the particular numeral being displayed at any time controlled by a selective energization of an electromagnet corresponding to that numeral. It is, of course, contemplated that a group of devices such as that shown in FIG. 1 may be cascaded together forming, for example, a five decade numerical output indication.

The specific arrangement of the operative elements of this indicating device is illustrated most particularly in FIGS. 2, 3, and 4, while the electrical schematic is illustrated in FIG. 5. As illustrated in FIGS. 2 and 3, the housing 10 has fixed to it a ring element 20 formed with a number of inwardly protruding posts 21 spaced circumferentially around its inner surface. In the form shown in FIGS. 2 and 3, there are eleven such posts 21 and ten of these posts have mounted on them electromagnetic coils 23. Since each of the posts 21 are equi-angularly spaced from each of the remaining posts, then none of the posts are on the same diameter, that is, no two posts are in diametrically opposite positions. The manner in which each of the electromagnetic coils 23 is electrically connected will be discussed below in connection with FIG. 5; however, a terminal board projection 15 extends from the rear face of the rectangular housing 10 and contains on it electrical connecting posts, one for each of the electromagnetic coils 23 and, in addition, a common electrical connection post. The ring element 20 is formed of a magnetically conducting material and with the electromagnet coils mounted thereon, it forms the stator element of the indicating device.

The rotor element of this device which is separately illustrated in FIG. 4, is seen to include a cylindrical section 25 having the characters to be indicated inscribed on its outer surface. A circular side plate 30 encloses one side of the cylindrical portion of the rotor element. A central hub 31 is mounted on the side plate 30 and extends into the center of cylinder 25. It will be noted that the side plate 30 is formed with several circular openings therein. This construction provides for a lighter mass rotor and hence decreases the inertia of the rotor in operation. A permanent magnet 35 having relatively sharply pointed poles is mounted on hub 31 and fixed to rotate with hub 31. The hub 31 fits over and rotates on a spindle 33, which is fastened to the housing 10 at the center of the ring 20 and extends into the central cavity of housing 10 in a direction normal to the plane of the ring 20. The magnet 35 is so positioned on the hub 31 that, when the rotor is mounted on the spindle 33, the poles of magnet 35 are in the same plane as the protruding posts 21, which with the electromagnetic coils wound around them form the pole pieces of electromagnets.

In FIG. 5, the schematic diagram of the electrical circuit of the device illustrated in FIG. 1 through 4 is shown. Each of the electromagnet coils 23 is connected to a terminal post, illustrated for example, at 40 and the opposite end of each of the coils is connected to a common terminal 41. The common terminal 41 is connected to one side of a voltage supply 43, indicated schematically in FIG. 5 as a battery. The other side of the voltage source 43 is connected to the center arm 45 of a switch 46. Thus, by positioning the arm 45 of switch 46, the voltage may be connected to any one of the selected terminals 40 and thereby energize only the selected electromagnet coil.

Considering now the operation of the above-described device, energization of one of the electromagnet coils 23 generates a magnetic field within the center area of the ring 21. The permanent magnet 35 aligns itself in accordance with the direction of the field and a magnetic path is then provided, running from the pole of the energized electromagnet through the rotor magnet 35 and returning from the other side of the ring 20 partly through the upper half of the ring 20 and partly through the lower half of the ring 20. The characters to be indicated are positioned on the rotor cylinder 25 in such a fashion that when the rotor magnet 35 is pointing towards the pole elements of the selected energized coil the corresponding character is located in the window portion 13 of the housing. Because of the arrangement of the circuit associated with this indicator, as shown in FIG. 5, the electromagnets are always energized with the same polarity so that the rotor magnet is never subjected to a 180° field reversal. Since the polarity of the energizing voltage is always the same then the same pole of the permanent magnet 35 will be attracted to the pole point of the energized electromagnet.

Since in the configuration illustrated in FIGS. 1, 2, and 3, no two of the electromagnets are located on the same diameter, then energization of any electromagnet does not require a 180° turn by the magnet 35 of the rotor, and hence a significant rotational torque is applied to the rotor whenever any one of the electromagnets is energized. When the power is removed from the electromagnet, the rotor 35 remains in its position since there remains a magnetic path from one pole on the rotor magnet 35 to a pole 21 of an electromagnet and back through each side of the ring 20 and then through one or both of the posts nearest the second pole on the rotor magnet 35 (e.g., posts 21a in FIG. 2) and thence back to the second pole of the rotor magnet 35.

While, in the configuration shown in the accompanying drawing, there are eleven posts 21 shown on the ring, this construction is not required. Thus, there could be no post at the blank post position shown in FIG. 2 (for example) and there could be but ten posts distributed as are the ten electromagnets in FIG. 2. Again, the arrangement shown in the accompanying figures, while it is a convenient one, is not the only appropriate one. Thus, for example, if only nine characters were to be indicated, then the nine electromagnets could be equi-angularly spaced about the stator ring, hence no two of the electromagnets would then lie on a single diameter. It is apparent that with the indicating device described and illustrated herein, it is immaterial whether in switching the device from one indicated character to another a period of "no power" exists between energizations, since with or without retained energization the rotor remains in the position corresponding to the electromagnet that was last energized until a different electromagnet is energized thus changing the orientation of the magnetic field.

Having described the invention, modifications and improvements will now occur to those skilled in the art and the invention described herein should be construed and limited only by the spirit and scope of the appended claims.

What is claimed is:

1. An electromagnetic indicator comprising:
    a panel having a window,
    a stator having an annular ferromagnetic core for establishing any one of a plurality of discretely oriented magnetic fields, the core having a plurality of inwardly protruding radial poles, the radial poles being spaced around the core so that no radial pole is diametrically opposite another radial pole, the stator including a plurality of windings, each winding being mounted upon a different radial pole and being arranged to be separately energizable by an electrical signal, a rotor having a magnet encircled by the stator's annular core, the rotor being pivotally mounted to permit the magnet to turn about an axis at the core's geometric center, the magnet having two diametrically opposed salient poles of opposite magnetic polarity, the rotor including a drum upon whose periphery symbols are marked, the drum being positioned to present the symbols in the window of the panel, each electrically energized winding of the stator being operative to produce a turning force upon the magnet which constrains the magnet to rotate into alignment with the radial pole of the energized winding, each different aligned position of the magnet causing the drum to be stationed so that a different symbol is centered in the panel's window, and the magnetic circuit established through the core by the magnet's flux causing the magnet to be held in the aligned position when the stator is electrically de-energized.

2. An electromagnetic indicator comprising:

a panel having a window, a stator having an annular ferromagnetic core for establishing any one of a plurality of discretely oriented magnetic fields, the core having an odd number of inwardly protruding radial poles, the radial poles being substantially uniformly spaced around the core so that no radial pole is diametrically opposite another radial pole, the stator including a plurality of windings, each winding being mounted upon a different radial pole and being arranged to be separately energizable by an electrical signal, each separately energized winding causing the stator to establish a different one of the discretely oriented magnetic fields, a rotor having a magnet encircled by the stator's annular core, the rotor being pivotally mounted to permit the magnet to turn about an axis at the core's geometric center, the magnet having two diametrically opposed salient poles of opposite magnetic polarity, the rotor including a drum upon whose periphery symbols are marked, the drum being positioned to present a different symbol in the window of the panel for each winding of the stator, each separately electrically energized winding always producing a turning force upon the magnet which constrains the magnet to rotate into alignment with the radial pole of the energized winding, each different aligned position of the magnet causing the drum to be positioned so that a different symbol is centered in the panel's window, and the magnetic circuit established through the core by the magnet's field causing the magnet to be held in the aligned position when the stator is electrically de-energized.

References Cited by the Examiner

UNITED STATES PATENTS

| | | | |
|---|---|---|---|
| 608,246 | 8/98 | Arldt | 310—49 |
| 2,943,313 | 6/60 | Gorden et al. | 340—378 |
| 3,089,131 | 5/63 | Morgan | 340—319 |
| 3,109,167 | 10/63 | Macintyre et al. | 340—325 |
| 3,118,138 | 1/64 | Milas et al. | 340—366 X |

THOMAS B. HABECKER, *Acting Primary Examiner.*

NEIL C. READ, *Examiner.*